W. H. NOELTING.
CASTER.
APPLICATION FILED APR. 21, 1919.
1,349,088.
Patented Aug. 10, 1920.
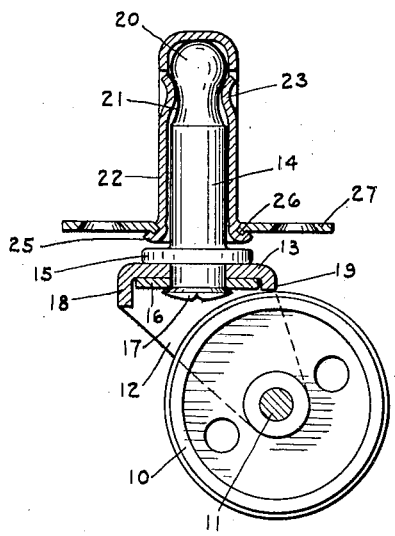
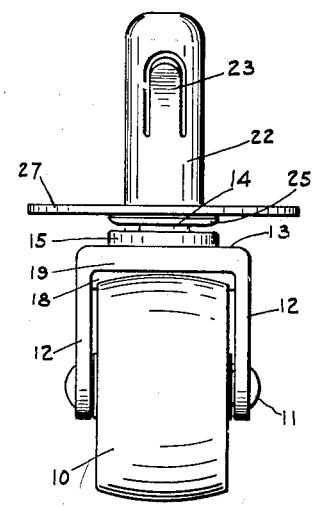
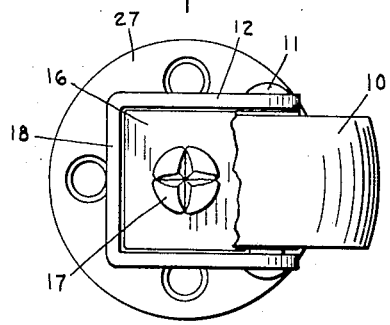
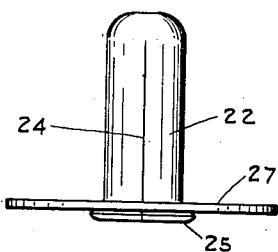
INVENTOR.
WILLIAM H. NOELTING.
BY
Lockwood Lockwood
ATTORNEYS

UNITED STATES PATENT OFFICE.

WILLIAM H. NOELTING, OF EVANSVILLE, INDIANA, ASSIGNOR TO FAULTLESS CASTER COMPANY, OF EVANSVILLE, INDIANA, A CORPORATION.

CASTER.

1,349,088.  Specification of Letters Patent.  Patented Aug. 10, 1920.

Application filed April 21, 1919. Serial No. 291,446.

*To all whom it may concern:*

Be it known that I, WILLIAM H. NOELTING, a citizen of the United States, and a resident of Evansville, county of Vanderburg, and State of Indiana, have invented a certain new and useful Caster; and I do hereby declare that the following is a full, clear, and exact description thereof, reference being had to the accompanying drawings, in which like numerals refer to like parts.

The object of this invention is to provide an improved, practical, strong and convenient caster for pianos, refrigerators and like heavy furniture or other portable structures.

The feature of the invention consists in the means shown for securing the track plate to the lower end of the socket, which consists in upsetting or upturning the lower end of the socket and forming an annular groove in the upper side of the flange thus formed, and providing the track plate with an annular flange adapted to enter into such groove or recess and unite them. This enables the stem and track plate to be made separately and yet be united so they cannot come apart during the heavy use to which such casters are subjected.

The full nature of the invention will be understood from the accompanying specification.

In the drawings, which are a part of the application, Figure 1 is a central vertical section through the caster. Fig. 2 is a front elevation of the caster. Fig. 3 is a bottom view of the caster with a portion of the wheel broken away. Fig 4 is an elevation of the caster socket.

There is shown herein in the drawings a caster wheel 10 mounted by rivets 11 in the yoke 12 of the plate 13. Said plate is perforated to receive the lower end of the caster stem 14 which lies below the collar 15 secured to the stem, and preferably forming a part thereof. A washer 16 is placed on the stem below the plate 13, and then the lower end of the stem is upset or laterally enlarged at 17 so as to secure the plate rigidly on the stem.

The apron 18 of the plate 13, which is remote from the wheel, extends relatively low for the purpose of strengthening the plate 13. But the apron 19, on the other side of the plate 13 and over the wheel, is relatively short, as short as it need be to bring the plate 13 down as close as possible to the wheel for strengthening the caster as compared with a structure with a long apron 19 and therefore with the plate 13 relatively far above the wheel.

The upper end of the caster stem is a rounded knob or head 20 with a reduced or neck portion 21 below the same, while the portion below the neck is of uniform diameter. The socket 22 is of slightly larger diameter than the body of the stem, and therefore the stem can be readily inserted in the socket, and there will be very little lateral play of the stem possible in the socket.

There usually is great trouble in the stem of caster working out while the piano is being moved over the floor with the weight thereof carried by the casters. To prevent such escape of the stem oppositely located tongues 23 are punched in the wall of the socket opposite the neck 21 of the stem, and the tongues are bowed inward substantially parallel with the neck and so that their upper ends point outward. The bowed upper portion of the tongue is adapted to engage the under side of the head 20 and push upwardly on it, if it attempts to escape. With this engagement there is only one bearing point between the head and the upper end of the socket and any forward movement of the head will be resisted by the upward pushing action of the tongues 23.

The lower end of the socket is turned outward to form an outwardly extending flange 25, and in the upper surface of said flange there is an annular groove, as shown in Fig. 1, adapted to receive the inwardly and downwardly turned flange 26 of the track plate 27 which is secured to the bottom of the bottom. This makes a very rigid and secure joint between the plate 27 and the socket, whereby they will not separate under the great strain to which they are subjected. The upper end of the socket is preferably flattened somewhat so that it bears on the center or topmost point of the head of the stem. The stem is preferably made from a straight strip of metal centrally bent and stamped in the form shown, the meeting edges being forced very tightly together at 24.

The invention claimed is:

A caster having a stem, a socket for receiving the stem with its lower end turned out to form an outwardly extending flange and with an annular groove on the upper side of the flange and projecting upwardly and outwardly, and a track plate surrounding the lower part of the stem with an inwardly and downwardly extending flange fitting in said groove in the socket flange.

In witness whereof, I have hereunto affixed my signature.

WILLIAM H. NOELTING.